(12) United States Patent
Wang et al.

(10) Patent No.: US 10,042,810 B2
(45) Date of Patent: Aug. 7, 2018

(54) HOST CONTROLLER OF HIGH-SPEED DATA INTERFACE WITH CLOCK-DOMAIN CROSSING

(71) Applicant: VIA Alliance Semiconductor Co., Ltd., Shanghai (CN)

(72) Inventors: Wanfeng Wang, Beijing (CN); Xiaoliang Ji, Beijing (CN); Zhiqiang Hui, Beijing (CN); Huiying Hou, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 180 days.

(21) Appl. No.: 15/171,362

(22) Filed: Jun. 2, 2016

(65) Prior Publication Data

US 2017/0161228 A1   Jun. 8, 2017

(30) Foreign Application Priority Data

Dec. 7, 2015   (CN) .......................... 2015 1 0894416

(51) Int. Cl.
*G06F 13/42* (2006.01)

(52) U.S. Cl.
CPC ...... *G06F 13/4291* (2013.01); *G06F 13/4282* (2013.01)

(58) Field of Classification Search
CPC .......................... G06F 13/4291; G06F 13/4282
See application file for complete search history.

(56) References Cited

U.S. PATENT DOCUMENTS

| | | | |
|---|---|---|---|
| 8,151,134 B2 * | 4/2012 | Huang ................ | G06F 13/4282 710/60 |
| 2012/0059964 A1 * | 3/2012 | Foster ....................... | G06F 1/12 710/300 |
| 2013/0205160 A1 * | 8/2013 | Turner ....................... | G06F 5/12 713/400 |
| 2017/0092343 A1 * | 3/2017 | Palmer ..................... | G11C 7/22 |

FOREIGN PATENT DOCUMENTS

| | | | |
|---|---|---|---|
| CN | 101689209 B | * 2/2013 | .......... G06F 13/385 |
| CN | 104158646 A | * 11/2014 | |

* cited by examiner

*Primary Examiner* — Jing-Yih Shyu
(74) *Attorney, Agent, or Firm* — McClure, Qualey & Rodack, LLP

(57) ABSTRACT

A host controller with suppressed data jitter is shown, which uses a logical physical layer (LPHY) to provide groups of low-speed data, uses a clock-domain-crossing transmitter (TXCDC) to transmit the groups of the low-speed data to the corresponding electrical physical layers (EPHYs), uses the EPHYs to convert the groups of the low-speed data to high-speed data and transmit the high-speed data to the corresponding external devices, and further has a multiplexer. Each EPHY corresponds to one clock signal and operates accordingly. The multiplexer receives the clock signals of the EPHYs to output a common clock signal for the LPHY to provide the groups of low-speed data and for the TXCDC to retrieve the groups of low-speed data. With respect to each of the external devices, the TXCDC uses the clock signal corresponding to the corresponding EPHY to output the corresponding group of low-speed data to the corresponding EPHY.

19 Claims, 5 Drawing Sheets

HOST CONTROLLER OF HIGH-SPEED DATA INTERFACE WITH CLOCK-DOMAIN CROSSING

CROSS REFERENCE TO RELATED APPLICATIONS

This application claims priority of China Patent Application No. 201510894416.7, filed on Dec. 7, 2015, the entirety of which is incorporated by reference herein.

BACKGROUND OF THE INVENTION

Field of the Invention

The present invention relates to host controllers of high-speed data interface, and particularly relates to those communicating with external devices at high speeds.

Description of the Related Art

For a high-speed data interface, such as a Serial Advanced Technology Attachment (SATA) interface, a Peripheral Component Interconnect Express (PCIE) interface, a secure digital input/output (SDIO) interface, a Universal Serial Bus (USB) interface, and so on, the clock signal may be delayed and data jitter may be generated accordingly. The high-speed data transmission may be significantly affected.

BRIEF SUMMARY OF THE INVENTION

A host controller with suppressed data jitter is shown, which may be implemented by the southbridge of a chipset.

A host controller in accordance with an exemplary embodiment of the disclosure has a logical physical layer, a plurality of electrical physical layers, a multiplexer and a clock-domain-crossing transmitter. The logical physical layer provides a plurality of groups of low-speed data. Each of the electrical physical layers converts one group of the low-speed data to high-speed data and transmits the high-speed data to one of a plurality of external devices. Each of the electrical physical layers operates according to one of a plurality of clock signals. The multiplexer receives the plurality of clock signals corresponding to the plurality of electrical physical layers to output a common clock signal for the logical physical layer to provide the plurality of groups of low-speed data based on the common clock signal. The clock-domain-crossing transmitter is coupled between the logical physical layer and the plurality of electrical physical layers, and uses the common clock signal to retrieve the plurality of groups of low-speed data provided from the logical physical layer. With respect to each of the external devices, the clock-domain-crossing transmitter uses the one of the plurality of clock signals corresponding to the electrical physical layer connected to the external device to output the corresponding group of low-speed data to the electrical physical layer connected to the external device.

A host controller in accordance with another exemplary embodiment of the disclosure has a logical physical layer, an electrical physical layer and a clock-domain-crossing transmitter. The logical physical layer provides first low-speed data. The electrical physical layer converts the first low-speed data to first high-speed data and transmits the first high-speed data to a first external device. The electrical physical layer operates according to a clock signal. The clock signal corresponding to the electrical physical layer is further transmitted to the logical physical layer to operate the logical physical layer to provide the first low-speed data. The clock-domain-crossing transmitter is coupled between the logical physical layer and the electrical physical layers, uses an LPHY side clock signal to retrieve the first low-speed data that the logical physical layer provides for the first external device, and uses a EPHY side clock signal to output the first low-speed data to the electrical physical layer.

The clock-domain-crossing transmitter considerably suppresses the problem of the clock being asynchronous between the electrical physical layer and the logical physical layer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

Figure 1:
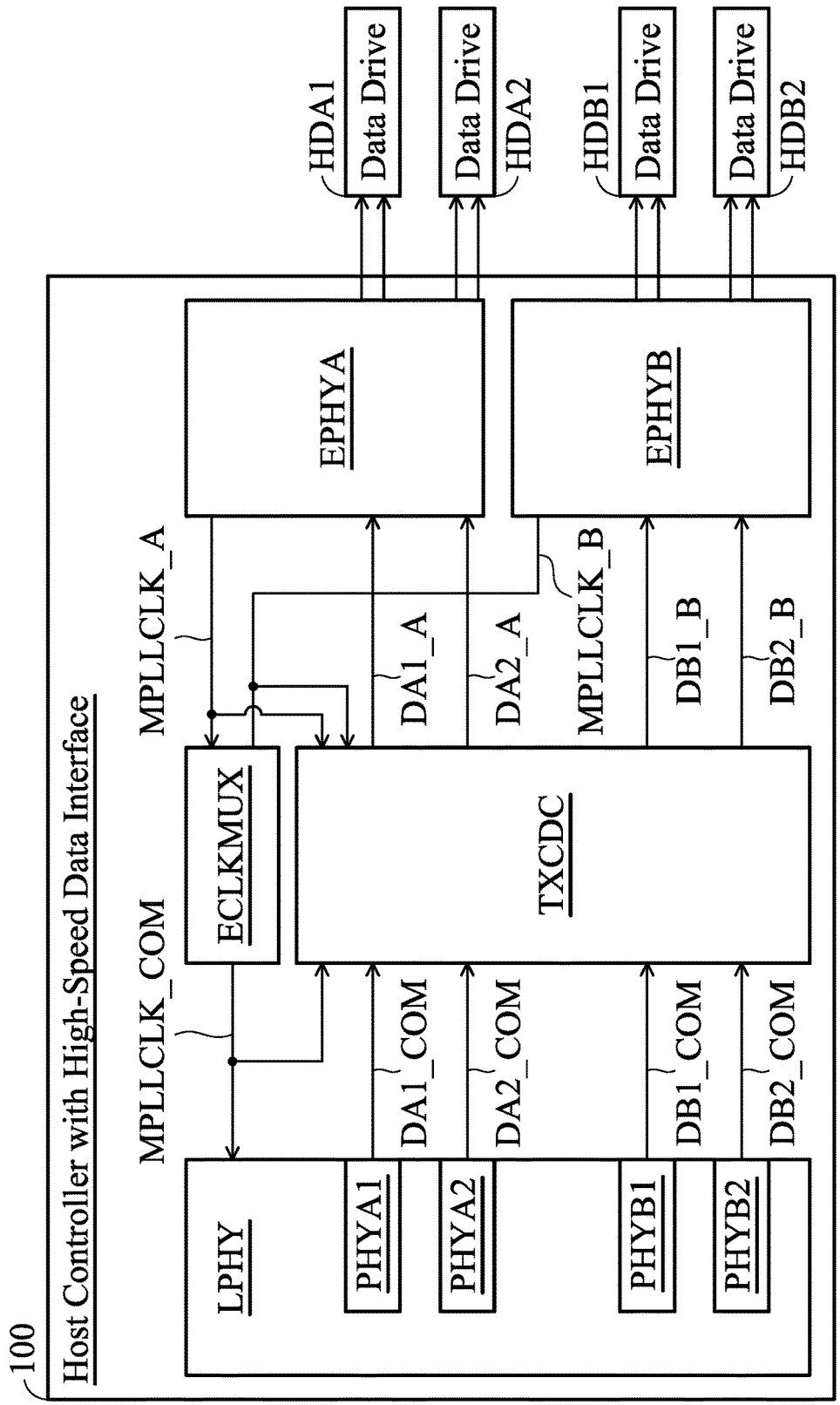
FIG. 1 is a block diagram depicting a host controller 100 of a high-speed data interface in accordance with an exemplary embodiment of the disclosure.

FIG. 1 is a block diagram depicting a host controller 100 of a high-speed data interface in accordance with an exemplary embodiment of the disclosure. The host controller 100 of a high-speed data interface includes a logical physical layer LPHY, a plurality of electrical physical layers (EPHYA and EPHYB), a multiplexer ECLKMUX and a clock-domain-crossing transmitter TXCDC. FIG. 1 only shows two electrical physical layers EPHYA and EPHYB but it is not intended to limit the number of electrical physical layers.

The electrical physical layers EPHYA and EPHYB are connected to external devices. The electrical physical layer EPHYA is connected to data drives HDA1 and HDA2 and the electrical physical layer EPHYB is connected to data drives HDB1 and HDB2. The electrical physical layers EPHYA and EPHYB operate in accordance with clock signals MPLLCLK_A and MPLLCLK_B, respectively. The clock signal MPLLCLK_A may be generated by the electrical physical layer EPHYA and the clock signal MPLLCLK_B may be generated by the electrical physical layer EPHYB. FIG. 1 shows that the electrical physical layers EPHYA and EPHYB each connect to two data drives, but it is not intended to limit the type and number of external devices connected to each electrical physical layer.

The multiplexer ECLKMUX receives the clock signals MPLLCLK_A and MPLLCLK_B corresponding to the electrical physical layers EPHYA and EPHYB, and outputs a common clock signal MPLLCLK_COM to be transmitted to the logical physical layer LPHY and the clock-domain-crossing transmitter TXCDC.

Based on the common clock signal MPLLCLK_COM, the logical physical layer LPHY uses circuit modules PHYA1, PHYA2, PHYB1 and PHYB2 within the logical physical layer LPHY to transmit low-speed data DA1_COM, DA2_COM, DB1_COM and DB2_COM corresponding to the data drives HDA1, HDA2, HDB1 and HDB2, respectively. Before being received by the data drives HDA1, HDA2, HDB1 and HDB2, the low-speed data DA1_COM, DA2_COM, DB1_COM and DB2_COM is transmitted to the clock-domain-crossing transmitter TXCDC.

The clock-domain-crossing transmitter TXCDC is coupled between the logical physical layer LPHY and the electrical physical layers EPHYA and EPHYB, and operates according to a clock-domain-crossing technique. Based on the common clock signal MPLLCLK_COM, the clock-domain-crossing transmitter TXCDC retrieves the low-speed data DA1_COM, DA2_COM, DB1_COM and DB2_COM provided from the logical physical layer LPHY. In an exemplary embodiment, the clock-domain-crossing transmitter TXCDC provides the external devices (e.g. data drives HDA1, HDA2, HDB1 and HDB2) with buffers (R_A1, R_A2, R_B1 and R_B2 of FIG. 2A and FIG. 2B) to buffer the low-speed data corresponding to the different external devices. Based on the clock signals of the corresponding electrical physical layers, the clock-domain-crossing transmitter TXCDC reads the buffers for the low-speed data. As shown in the FIG. 1, corresponding to the electrical physical layer EPHYA operating according to the clock signal MPLLCLK_A, the low-speed data DA1_A is read from the corresponding buffer based on the clock signal MPLLCLK_A and transmitted to the electrical physical layer EPHYA to be converted to high-speed data and then transmitted to the data drive HDA1 and the low-speed data DA2_A is read from the corresponding buffer based on the clock signal MPLLCLK_A and transmitted to the electrical physical layer EPHYA to be converted to high-speed data and then transmitted to the data drive HDA2. Corresponding to the electrical physical layer EPHYB operating according to the clock signal MPLLCLK_B, the low-speed data DB1_B is read from the corresponding buffer based on the clock signal MPLLCLK_B and transmitted to the electrical physical layer EPHYB to be converted to high-speed data and then transmitted to the data drive HDB1 and the low-speed data DB2_B is read from the corresponding buffer based on the clock signal MPLLCLK_B and transmitted to the electrical physical layer EPHYB to be converted to high-speed data and then transmitted to the data drive HDB2. Each buffer stores data in stacks. Thus, a clock-domain-crossing technique which buffers low-speed data and reads out high-speed data is workable.

As shown in FIG. 1, it is easier to design the logical physical layer LPHY when the logical physical layer LPHY simply operates according to the common clock signal MPLLCLK_COM. In conventional techniques, to operate the different circuit modules (e.g. PHYA1, PHYA2, PHYB1 and PHYB2) within the logical physical layer LPHY and corresponding to multiple electrical physical layers (e.g. EPHYA and EPHYB), multiple clock signals (e.g. MPLLCLK_A and MPLLCLK_B) are required. Because the clock signals (e.g. MPLLCLK_A and MPLLCLK_B) provided from the different electrical physical layers (e.g. EPHYA and EPHYB), are asynchronous, the clock tree is complicated. In comparison with conventional techniques, the logical physical layer LPHY simply operates according to the common clock signal MPLLCLK_COM, which considerably simplifies the clock tree. Furthermore, the clock-domain-crossing transmitter TXCDC coupled between the logical physical layer LPHY and the electrical physical layers EPHYA and EPHYB effectively suppresses the delay problems of circuit traces. In conventional techniques, a logical physical layer is directly coupled to electrical physical layers by long circuit traces. The clock-domain-crossing transmitter TXCDC, however, cuts the circuit traces in half and corrects the trace delay in time.

In an exemplary embodiment, the trace length of the clock signal MPLLCLK_A and the trace length of the clock signal MPLLCLK_B are used in determining which one of the electrical physical layers EPHYA and EPHYB is closer to the logical physical layer LPHY. In FIG. 1, the electrical physical layer EPHYA is closer to the logical physical layer LPHY than the electrical physical layer EPHYB. The multiplexer ECLKMUX outputs the clock signal MPLLCLK_A generated by the closest electrical physical layer EPHYA to be the common clock signal MPLLCLK_COM. Thus, the clock signal MPLLCLK_A delayed less by the circuit trace is adopted by the logical physical layer LPHY. In an exemplary embodiment the trace length means within an ASIC (Application Specific Integrated Circuits), the length of the circuit traces for transmitting the clock signals MPLLCLK_A and MPLLCLK_B from the electrical physical layers EPHYA and EPHYB to the logical physical layer LPHY. In the aforementioned example, the common clock signal MPLLCLK_COM is selected based on the trace length comparison because the asynchronous clock signals MPLLCLK_A and MPLLCLK_B oscillate at the same frequency. When the frequencies of the clock signals MPLLCLK_A and MPLLCLK_B are different, the common clock signal MPLLCLK_COM may be generated in another way, which is detailed later.

In an exemplary embodiment, the circuit traces between the logical physical layer LPHY and the clock-domain-crossing transmitter TXCDC (for transmission of the low-speed data DA1_COM, DA2_COM, DB1_COM and DB2_COM) are shorter than the distance between the logical physical layer LPHY and the closest electrical physical layer EPHYA. Even in some embodiments, the circuit traces between the clock-domain-crossing transmitter TXCDC and the closest electrical physical layer EPHYA (for transmission of the low-speed data DA1_A, DA2_A, DB1_B and DB2_B) are also shorter than the distance between the logical physical layer LPHY and the closest electrical physical layer EPHYA. In this manner, the delay problems of circuit traces are more significantly suppressed by the clock-domain-crossing transmitter TXCDC.

In an exemplary embodiment, the logical physical layer LPHY outputs the low-speed data DA1_COM, DA2_COM, DB1_COM and DB2_COM to the clock-domain-crossing transmitter TXCDC in parallel transmission, the clock-domain-crossing transmitter TXCDC further outputs the low-speed data DA1_A, DA2_A, DB1_B and DB2_B to the electrical physical layers EPHYA and EPHYB in parallel transmission, and the electrical physical layers EPHYA and EPHYB convert low-speed data DA1_A, DA2_A, DB1_B and DB2_B from parallel low-speed data to serial high-speed data (e.g. differential signals) to be received by the data drives HDA1, HDA2, HDB1 and HDB2. The low-speed logical physical layer LPHY and the high-speed electrical physical layers EPHYA and EPHYB, therefore, are combined and used in high-speed interface, such as a SATA interface, a PCIE interface, an SDIO interface and a USB interface and so on.

In an exemplary embodiment, the clock signals MPLLCLK_A and MPLLCLK_B and the common clock signal MPLLCLK_COM oscillate at the same frequency, 300 MHz. Data is transmitted from the logical physical layer LPHY to the clock-domain-crossing transmitter TXCDC in parallel transmission of 20-bits. The electrical physical layers EPHYA and EPHYB transmit data in a high-speed serial transmission up to 6 Gbps.

The exemplary embodiment of FIG. 1 is not intended to limit the number of electrical physical layers, the number of external devices connected to the electrical physical layers and the relative layout of the electrical physical layers and the logical physical layer. In some exemplary embodiments, the frequencies of the clock signals from the electrical physical layers may be different. In an example, the clock signal MPLLCLK_A from the electrical physical layer EPHYA is 300 MHz, and the clock signal MPLLCLK_B from the electrical physical layer EPHYB is 150 MHz. Instead of comparing the trace lengths of the clock signals MPLLCLK_A and MPLLCLK_B, the multiplexer ECLKMUX outputs the clock signal MPLLCLK_A which has the highest frequency as the common clock signal MPLLCLK_COM. The logical physical layer LPHY includes a frequency divider that performs frequency division on the 300 MHz common clock signal MPLLCLK_COM to get a plurality of frequency-divided common clock signals (including that divided by 1). For example, in addition to the clock signal of 300 MHz, a clock signal of 150 MHz is also available in the logical physical layer LPHY. In accordance with the common clock signal MPLLCLK_COM that is 300 MHz, the circuit modules PHYA1 and PHYA2 within the logical physical layer LPHY operate (e.g. to provide the low-speed data DA1_COM and DA2_COM). In accordance with the frequency-divided common clock signal that is 150 MHz, the circuit modules PHYB1 and PHYB2 within the logical physical layer LPHY operate (e.g. to provide the low-speed data DB1_COM and DB2_COM). Within the logical physical layer LPHY, which one of the frequency-divided common clock signal is adopted to operate each circuit module depends on the frequency of the clock signal (MPLLCLK_A or MPLLCLK_B) of the electrical physical layer (EPHYA or EPHYB) connected to the external device (HDA1, HDA2, HDB1 or HDB2) corresponding to the circuit module. The frequency of the frequency-divided common clock signal used by each circuit module and the frequency of the clock signal of the electrical physical layer connected to the external device corresponding to the circuit module are the same. In another exemplary embodiment, the clock-domain-crossing transmitter TXCDC also includes a frequency divider to perform frequency division on the 300 MHz common clock signal MPLLCLK_COM to get a plurality of frequency-divided common clock signals (including that divided by 1). For example, in addition to the clock signal of 300 MHz, a clock signal of 150 MHz is also available in the clock-domain-crossing transmitter TXCDC. With respect to the clock signal MPLLCLK_A of the electrical physical layer EPHYA that is 300 MHz, the clock-domain crossing transmitter TXCDC retrieves the low-speed data DA1_COM and DA2_COM based on the 300 MHz frequency-divided common clock signal. With respect to the clock signal MPLLCLK_B of the electrical physical layer EPHYB that is 150 MHz, the clock-domain crossing transmitter TXCDC retrieves the low-speed data DB1_COM and DB2_COM based on the 150 MHz frequency-divided common clock signal. Furthermore, the clock-domain crossing transmitter TXCDC reads the buffers therein for the low-speed data DA1_A and DA2_A based on the clock signal MPLLCLK_A of the electrical physical layer EPHYA connected to the data drives HDA1 and HDA2, and reads the buffers therein for the low-speed data DB1_B and DB2_B based on the clock signal MPLLCLK_B of the electrical physical layer EPHYB connected to the data drives HDB1 and HDB2.

Figure 2A:
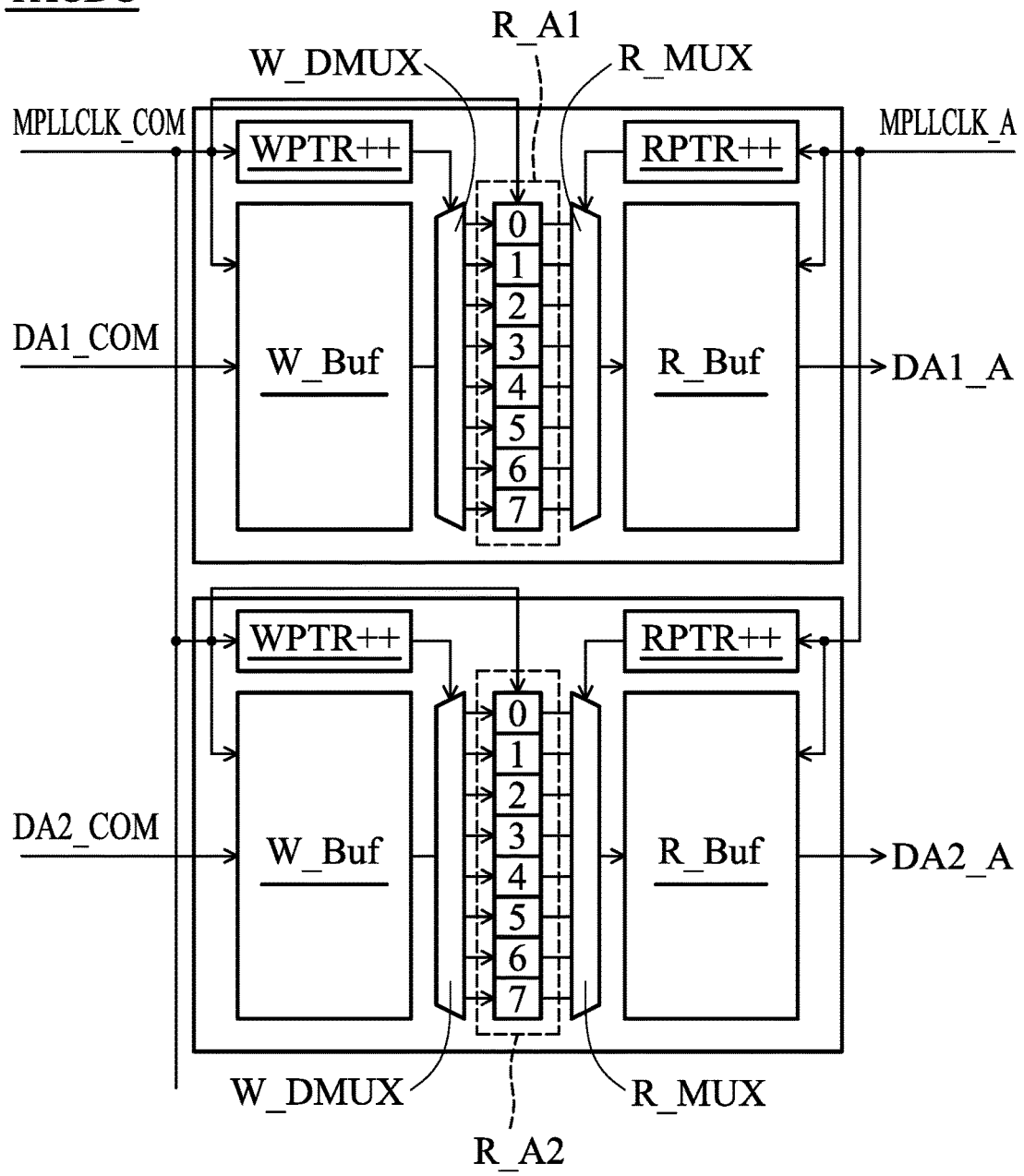
FIG. 2A and FIG. 2B show the clock-domain-crossing transmitter TXCDC in accordance with an exemplary embodiment of the disclosure.
Figure 2B:
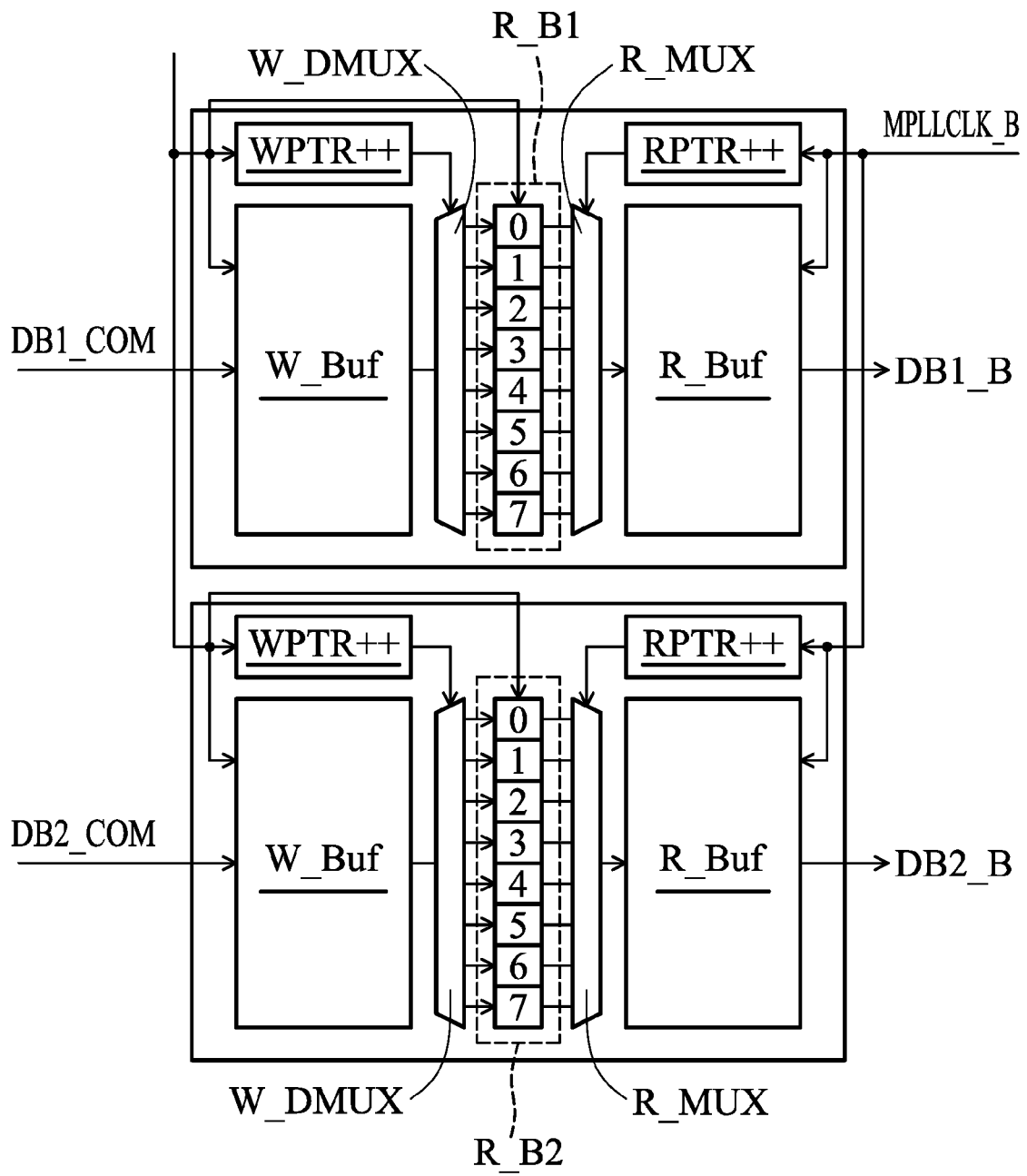

FIG. 2A and FIG. 2B show the clock-domain-crossing transmitter TXCDC in accordance with an exemplary embodiment of the disclosure. The clock-domain-crossing transmitter TXCDC include buffers R_A1, R_A2, R_B1 and R_B2 to buffer data for the data drives HDA1, HDA2, HDB1 and HDB2, respectively. Each of the buffers R_A1, R_A2, R_B1 and R_B2 has eight registers numbered from 0 to 7. The size of each register is the same as the size of the low-speed parallel data. The buffer depths from 0 to 7, therefore, are provided. The low-speed data DA1_COM, DA2_COM, DB1_COM and DB2_COM from the logical physical layer LPHY are buffered into the buffers W_Buf based on the common clock signal MPLLCLK_COM. Then, the write pointer generators WPTR++ operate the write demultiplexers W_DMUX based on the common clock signal MPLLCLK_COM to further push the low-speed data DA1_COM, DA2_COM, DB1_COM and DB2_COM to the registers of the buffers R_A1, R_A2, R_B1 and R_B2, respectively. To read data from the buffers R_A1, R_A2, R_B1 and R_B2 to the buffers R_Buf, the read pointer generators RPTR++ operate the read multiplexers R MUX based on the corresponding clock signal MPLLCLK_A or MPLLCLK_B. Then, the data in the buffers R_Buf is read out as the low-speed data DA1_A, DA2_A, DB1_B and DB2_B based on the corresponding clock signals MPLLCLK_A/MPLLCLK_B.

Figure 3:
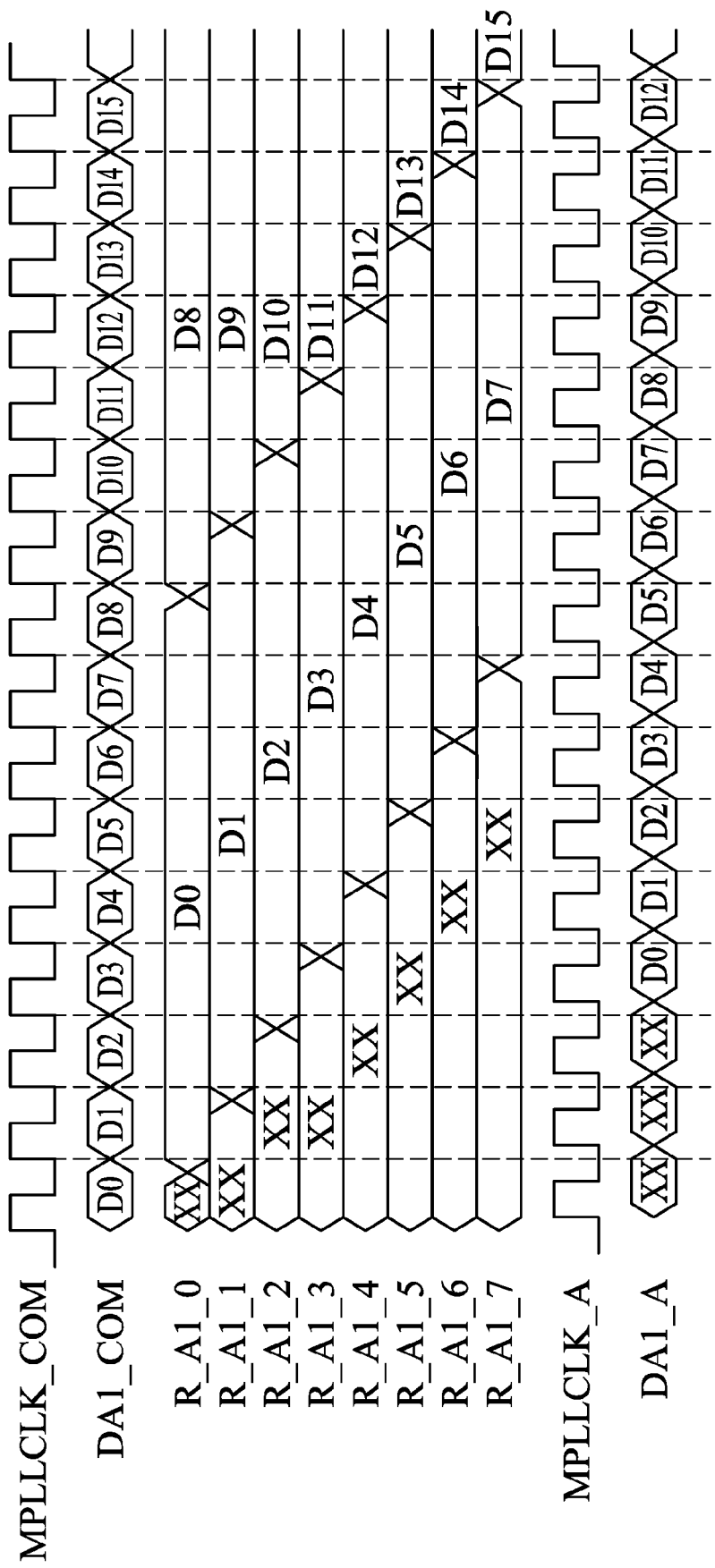
FIG. 3 shows waveforms about operations of the buffer R_A1. The number 0 to number 7 registers of the buffer R_A1 are named from R_A1_0 to R_A1_7.

FIG. 3 shows waveforms about operations of the buffer R_A1. The number 0 to number 7 registers of the buffer R_A1 are named from R_A1_0 to R_A1_7. As shown, parallel data D0 to D7 pushed into the registers R_A1_0 to R_A1_7 in different buffer depths of the buffer R_A1 according to the common clock signal MPLLCLK_COM is successfully read out according to the clock signal MPLLCLK_A as those shown in the waveform of the low-speed data DA1_A. Later, another batch of data D8 to D15 is pushed into the buffer R_A1 to update the registers R_A1_0 to R_A1_7 in the different buffer depths. Data D8 to D15 in the registers of different buffer depths is also successfully read out according to the clock signal MPLLCLK_A as those shown in the waveform of the low-speed data DA1_A.

Figure 4:
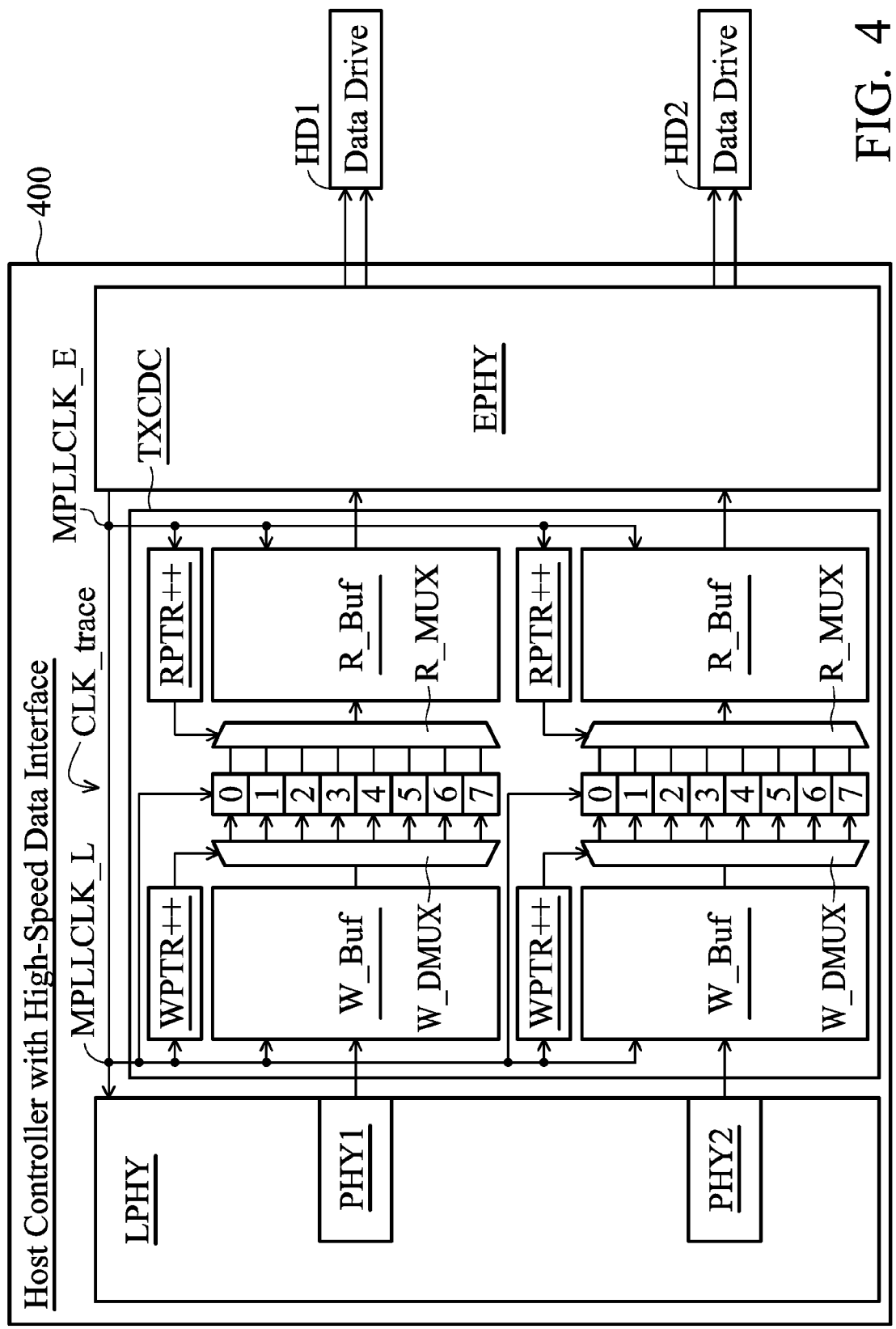
FIG. 4 is a block diagram depicting a host controller 400 of a high-speed data interface in accordance with an exemplary embodiment of the disclosure, which uses one single electrical physical layer EPHY to connect to at least one external device.

FIG. 4 is a block diagram depicting a host controller 400 of a high-speed data interface in accordance with an exemplary embodiment of the disclosure, which uses one single electrical physical layer EPHY to connect to at least one external device, e.g. the data drives HD1 and HD2 in the figure. Corresponding to the data drives HD1 and HD2, the clock-domain-crossing transmitter TXCDC includes a pair of buffer modules. The logical physical layer LPHY and the clock-domain-crossing transmitter TXCDC transmit parallel data. The electrical physical layer EPHY may provide a parallel-to-serial conversion.

In comparison with the host controller 100 of FIG. 1 that includes a multiplexer ECLKMUX, the clock signal of the single electrical physical layer EPHY in the host controller 400 may be simply transmitted to the logical physical layer LPHY via the clock signal trace CLK_trace. Based on the clock signal received from the clock signal trace CLK_trace, the circuit modules PHY1 and PHY2 output the first and the second low-speed data, respectively. As shown in FIG. 4, from an LPHY side terminal MPLLCLK_L and a EPHY side terminal MPLLCLK_E on the clock signal trace CLK_trace, the clock-domain-crossing transmitter TXCDC retrieves an LPHY side clock signal (also labeled MPLL-CLK_L) and a EPHY side clock signal (also labeled MPLL-CLK_E), respectively. On the clock signal trace CLK_trace, the LPHY side terminal MPLLCLK_L is at the logical physical layer LPHY side and the EPHY side terminal MPLLCLK_E is at the electrical physical layer EPHY side. The signal retrieved from the LPHY side terminal MPLL-CLK_L is transmitted to the clock-domain-crossing transmitter TXCDC, and the signal retrieved from the EPHY side terminal MPLLCLK_E is also transmitted to the clock-domain-crossing transmitter TXCDC. In comparison with the EPHY side terminal MPLLCLK_E, the LPHY side terminal MPLLCLK_L is closer to the logical physical layer LPHY along the clock signal trace CLK_trace. In FIG. 4, the clock-domain-crossing transmitter TXCDC still effectively suppresses the delay problems of circuit traces. In an exemplary embodiment, the circuit traces from the clock-domain-crossing transmitter TXCDC to the logical physical layer LPHY are shorter than the clock signal trace CLK_trace, and the circuit traces from the clock-domain-crossing transmitter TXCDC to the electrical physical layer EPHY are shorter than the clock signal trace CLK_trace. Compared with the conventional techniques, in which a logical physical layer is directly coupled to electrical physical layers by long circuit traces, the clock-domain-crossing transmitter TXCDC cuts the circuit traces in half and corrects the delay of circuit traces in time.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A host controller of high-speed data interface, comprising:
   a logical physical layer and a plurality of electrical physical layers, wherein the logical physical layer provides a plurality of groups of low-speed data, each of the electrical physical layers converts one group of the low-speed data to high-speed data and transmit the high-speed data to one of a plurality of external devices, and each of the electrical physical layers operates according to one of a plurality of clock signals;
   a multiplexer, receiving the plurality of clock signals corresponding to the plurality of electrical physical layers to output a common clock signal for the logical physical layer to provide the plurality of groups of low-speed data based on the common clock signal; and
   a clock-domain-crossing transmitter, coupled between the logical physical layer and the plurality of electrical physical layers, and using the common clock signal to retrieve the plurality of groups of low-speed data provided from the logical physical layer,
   wherein, with respect to each of the external devices, the clock-domain-crossing transmitter uses the one of the plurality of clock signals corresponding to the electrical physical layer connected to the external device to output the corresponding group of low-speed data to the electrical physical layer connected to the external device.

2. The host controller of high-speed data interface as claimed in claim 1, wherein:
   the clock-domain-crossing transmitter further provides each external device with a buffer to buffer the corresponding group of low-speed data.

3. The host controller of high-speed data interface as claimed in claim 1, wherein:
   the multiplexer outputs a clock signal of a closest electrical physical layer among the plurality of electrical physical layers to be the common clock signal; and
   the closest electrical physical layer is closer to the logical physical layer than the other electrical physical layers of the plurality of electrical physical layers.

4. The host controller of high-speed data interface as claimed in claim 3, wherein frequencies of the plurality of clock signals corresponding to the different electrical physical layers are the same.

5. The host controller of high-speed data interface as claimed in claim 1, wherein:
   circuit traces between the clock-domain-crossing transmitter and the logical physical layer are shorter than a distance between the logical physical layer and a closest electrical physical layer among the plurality of electrical physical layers, and the closest electrical physical layer is closer to the logical physical layer than the other electrical physical layers of the plurality of electrical physical layers; and
   circuit traces between the clock-domain-crossing transmitter and the closest electrical physical layer are shorter than the distance between the logical physical layer and the closest electrical physical layer.

6. The host controller of high-speed data interface as claimed in claim 1, wherein:
   the logical physical layer provides the plurality of groups of low-speed data to the clock-domain-crossing transmitter in parallel transmission;
   the clock-domain-crossing transmitter outputs the plurality of groups of low-speed data to the electrical physical layers in parallel transmission; and
   the electrical physical layers converting each of the plurality of groups of low-speed data to the high-speed data each further performing a parallel-to-serial conversion to provide the external devices with high-speed serial data.

7. The host controller of high-speed data interface as claimed in claim 1, wherein:
   at least one of the electrical physical layers is coupled to more than one of the external devices.

8. The host controller of high-speed data interface as claimed in claim 1, wherein:
   the multiplexer outputs a highest-frequency clock signal having a highest frequency among the plurality of clock signals corresponding to the plurality of electrical physical layers to be the common clock signal.

9. The host controller of high-speed data interface as claimed in claim 1, wherein:
   the logical physical layer has a first frequency divider performing frequency division on the common clock signal to get a plurality of frequency-divided common clock signals; and
   the logical physical layer uses the frequency-divided common clock signals to provide the plurality of groups of low-speed data; and with respect to each external device, a frequency of the frequency-divided common clock signal adopted by the logical physical layer to provide the corresponding group of low-speed data is the same as a frequency of the clock signal corresponding to the electrical physical layer connected to said external device.

10. The host controller of high-speed data interface as claimed in claim 1, wherein:

the clock-domain-crossing transmitter includes a second frequency-divider performing frequency division on the common clock signal to get a plurality of frequency-divided common clock signals; and the clock-domain-crossing transmitter uses the frequency-divided common clock signals to retrieve the plurality of groups of low-speed data provided from the logical physical layer; and with respect to each external device, a frequency of the frequency-divided common clock signal adopted by the clock-domain-crossing transmitter to retrieve the corresponding group of low-speed data is the same as a frequency of the clock signal corresponding to the electrical physical layer connected to said external device.

11. A host controller of high-speed data interface, comprising:

a logical physical layer (LPHY) and an electrical physical layer (EPHY), wherein the logical physical layer provides first low-speed data, the electrical physical layer converts the first low-speed data to first high-speed data and transmits the first high-speed data to a first external device, the electrical physical layer operates according to a clock signal, and the clock signal is further transmitted to the logical physical layer to operate the logical physical layer to provide the first low-speed data; and a clock-domain-crossing transmitter, coupled between the logical physical layer and the electrical physical layers, using an LPHY side clock signal to retrieve the first low-speed data that the logical physical layer provides for the first external device, and using a EPHY side clock signal to output the first low-speed data to the electrical physical layer.

12. The host controller of high-speed data interface as claimed in claim 11, wherein:

the clock-domain-crossing transmitter further provides a first buffer corresponding to the first external device to buffer the first low-speed data retrieved according to the LPHY side clock signal.

13. The host controller of high-speed data interface as claimed in claim 11, further comprising:

a clock signal trace, delivering the clock signal from the electrical physical layer to the logical physical layer, wherein the clock-domain-crossing transmitter retrieves the LPHY side clock signal from an LPHY side terminal on the clock signal trace, and retrieves the EPHY side clock signal from an EPHY side terminal on the clock signal trace.

14. The host controller of high-speed data interface as claimed in claim 13, wherein, along the clock signal trace, the LPHY side terminal is closer to the logical physical layer than the EPHY side terminal.

15. The host controller of high-speed data interface as claimed in claim 11, wherein:

circuit traces between the clock-domain-crossing transmitter and the logical physical layer are shorter than a clock signal trace that delivers the clock signal from the electrical physical layer to the logical physical layer; and circuit traces between the clock-domain-crossing transmitter and the electrical physical layer are shorter than the clock signal trace.

16. The host controller of high-speed data interface as claimed in claim 11, wherein:

the logical physical layer provides the first low-speed data to the clock-domain-crossing transmitter in parallel transmission;

the clock-domain-crossing transmitter outputs the first low-speed data to the electrical physical layer in parallel transmission; and the electrical physical layer converting the first low-speed data to the first high-speed data further performs a parallel-to-serial conversion to provide the first external device with high-speed serial data.

17. The host controller of high-speed data interface as claimed in claim 11, wherein:

the logical physical layer further provides second low-speed data corresponding to a second external device connected to the electrical physical layer; and the clock-domain-crossing transmitter further uses the LPHY side clock signal to retrieve the second low-speed data that the logical physical layer provides for the second external device, and uses the EPHY side clock signal to output the second low-speed data to the electrical physical layer.

18. The host controller of high-speed data interface as claimed in claim 17, wherein:

the clock-domain-crossing transmitter further provides a second buffer corresponding to the second external device to buffer the second low-speed data retrieved according to the LPHY side clock signal.

19. The host controller of high-speed data interface as claimed in claim 11, wherein:

the clock signal, the LPHY side clock signal and the EPHY side clock signal come from the same source.

* * * * *